Figure 1:
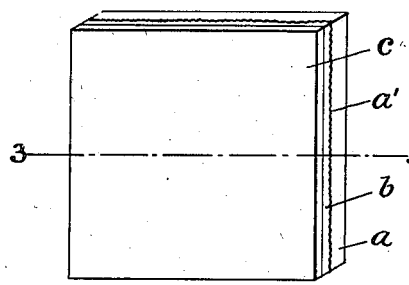

June 10, 1924.

J. A. H. HATT

PHOTOGRAPHIC PLATE

Filed Feb. 11, 1922

1,497,272

Ground Glass Surface — Photo Sensitive Layer — Glass — Light Transmitting Material of Non-Reflecting Characteristics Developed Layer WITNESS
G. V. Rasmussen

INVENTOR
JOSEPH ARTHUR HENRY HATT
BY
ATTORNEYS

Patented June 10, 1924.

1,497,272

UNITED STATES PATENT OFFICE.

JOSEPH ARTHUR HENRY HATT, OF NEW YORK, N. Y.

PHOTOGRAPHIC PLATE.

Application filed February 11, 1922. Serial No. 535,692.

*To all whom it may concern:*

Be it known that I, JOSEPH ARTHUR HENRY HATT, a citizen of the United States, and resident of New York, county of New York, and State of New York, have invented certain new and useful Improvements in Photographic Plates, of which the following is a specification.

The invention has for its objects the preparation of sensitive plates for photographic uses which will cause the image to appear upon the plate when developed without accompanying halation.

It is well known that photographic plates when exposed to ordinary (reflected) light will frequently exhibit in the regions adjacent to those where the more intense light rays reach the sensitive surface a certain cloudy effect known as halation. Halation is caused by light passing through the film carried by a glass plate and striking the glass surface at the back of the plate, the light being then reflected back toward the film thereby causing the fog or halation which disturbs the true tonal values. The particular form of halation just referred to is, of course, that one ordinarily occurring when the sensitive plate in the camera is placed with the film side towards the lens. Another form of halation is produced when the plate is so placed in the camera that the glass side is toward the lens. In the latter case the light passes through the glass, strikes the inner surface thereof, i. e. the surface on which the film coating rests, is then reflected back to the outer surface and then again toward the film, thereby again producing the fog or halation which disturbs the tonal values.

One method of preventing halation is to coat the back or glass side of the plate with an opaque non-actinic or non-reflecting coating. This is generally known in the art as backing the plate.

Another method for preventing halation is to first coat the dry plate with a very slow emulsion and then on top of this slow emulsion adding a coat of a fast, rapid or higly sensitive emulsion. Such plates are known in the trade under the name of double coated plates. Both of these methods, however, depend upon using the plate with the film side toward the lens in the camera and cannot be used in a reverse position. For many purposes, however, especially in color work, it is necessary to make the exposure upon a plate which in the camera has the glass side toward the lens, and none of the available processes of preparing plates was capable of yielding a plate which could be used in this way and would not show up the objectionable halation when exposed to a fairly brilliant reflected light. I, therefore, endeavored to discover some method of preparing plates which could be reliably used in any desired position in the camera and which would from their construction automatically prevent halation.

Figure 2:
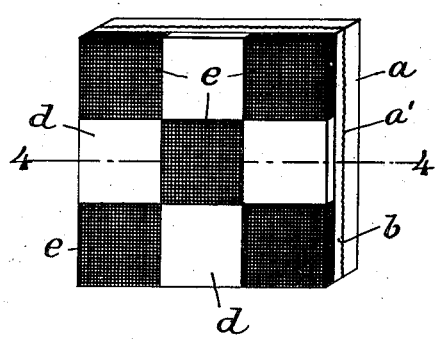
Figure 3:
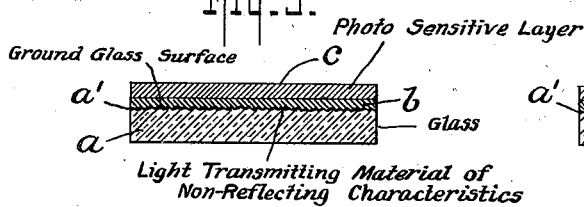
Figure 4:
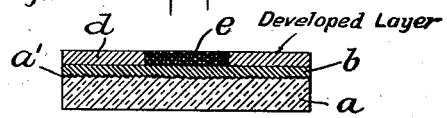

The invention is illustrated in the accompanying drawings in which Fig. 1 is an illustrative top view of my plate before the same has been developed and Fig. 2 is a similar view after it has been exposed and developed; Fig. 3 is a section on line 3—3 of Fig. 1 and Fig. 4 is a section on line 4—4 of Fig. 2, the sectional views being enlarged and exaggerated for the purposes of clear pictorial illustration.

In the drawings *a* illustrates the usual glass plate; *c* constitutes the sensitized gelatine surface; *d* and *e* are respectively developed and fixed portions of the sensitized surface after exposure to light, *d* representing those parts of said surface unacted upon by the light, while *e* represents the parts that have been acted upon by light; *b* represents a layer of non-glossy material such as talc or rubber or equivalent material which is interposed between the inner surface of the sensitive layer *c* (or the developed layer, *d*, *e*) and the surface *a'* of the glass plate *a*. The jagged appearance of the surface *a'* is intended to illustrate that the glass has been ground or rendered non-transparent whilst remaining translucent.

In Fig. 2 it will be seen that the lines between light and dark are clear cut and that there is no fog or halation upon the parts *d* adjacent to the squares *e* such as will usually be found in any ordinary photographic plate.

In certain classes of photo process color work, as in half-tone photography, the image on the plate is usually produced by permitting the light to be interrupted by a screen and the design shown in Fig. 2 is illustrative of a plate thus produced. In dealing with such plates where instead of employing reflected rays of light as in ordinary photography, direct rays from arc or other electric lamps are used, the light is frequently of high intensity, a condition that tends to produce more halation than is produced by a light of low intensity. For this reason it is advisable to substitute in making plates to be used for printing purposes arc or other lamps with a diffusing screen in front of them in place of the bare arc lamps generally employed.

It will be observed from the drawings that I make use of glass the polished surface of which has been destroyed, preferably by etching or grinding or with a matt varnish or ground-glass varnish until the surface $a'$ acquires the appearance of ground glass. I have found that if the sensitized gelatine layer is applied to such a ground glass surface either directly or upon a substratum composed of albumen, I obtain as much and sometimes even more halation than when polished glass is used. When, however, in connection with the ground glass surface I use a coating composed of a thin solution of india rubber dissolved in benzene or a coating of talc or other equivalent coating which has no glossy effect, then halation is completely eliminated. With such a structure halation is disposed of irrespective of which side of the plate faces the lens.

My method of making these plates and the plates themselves, although especially adapted for photographic color work, constitute a practical and economical instrument for preventing halation in all manner of photography. The salient feature of my invention resides, as I have explained, in employing between the usual transparent foundation (glass or the like) and the usual sensitized film (gelatine or the like) a substratum or layer of material which will be non-reflecting or will resist the further reflective transmission of light sufficiently to prevent the clouding of the sensitive parts of the plate when not exposed to the rays of light photographically used. Preferably, of course, the use of such a substratum will be in connection with a ground glass surface of the foundation plate, that is, upon a surface from which the polished effect has been removed or on which no such polished effect is active.

Instead of using a physical layer of non-reflecting material such as a layer of transparent rubber, it is possible to make use of coloring matter incorporated with a varnish or other suitable substratum, with which the glass or sensitive film support may be coated before the sensitive film is applied. This coloring matter to be used between the sensitive film and the glass in the same manner as the layer of rubber.

The effect of such coloring matter is to prevent the passage of that form of light therethrough which is most likely to produce halation. The coloring matter may be pale yellow, pale green or pale red (not pink), any of these colors will obstruct violet rays to a certain extent, and will obstruct the ultra-violet rays altogether in most cases.

The violet rays being the most actinic light rays in photography are also the rays of light that produce the greatest amount of halation.

I claim—

1. A plate for use in photography comprising a transparent foundation and a layer of material rendered sensitive to light and, interposed between said foundation and said layer, a stratum of light-transmitting material of non-reflecting characteristics.

2. A plate for use in photography comprising a transparent foundation one surface of which is a non-polished surface and on the same side of said foundation as the non-polished surface thereof, a layer of material rendered sensitive to light and, interposed between said foundation and said layer, a stratum of material of light-transmitting but non-reflecting characteristics.

3. A dry plate comprising a sheet of glass one surface of which is non-polished, a coating from a rubber solution carried by said non-polished surface and a layer of light sensitive material carried by said coating.

4. A dry plate comprising a sheet of glass one surface of which is non-polished, a coating from a rubber solution carried by said non-polished surface and a sensitized gelatine layer carried by said coating.

In testimony whereof I have hereunto set my hand.

JOSEPH ARTHUR HENRY HATT.